June 5, 1934.                    H. P. DONLE                    1,961,632
                        TELEVISION METHOD AND APPARATUS
                        Filed Aug. 21, 1931          2 Sheets-Sheet 1
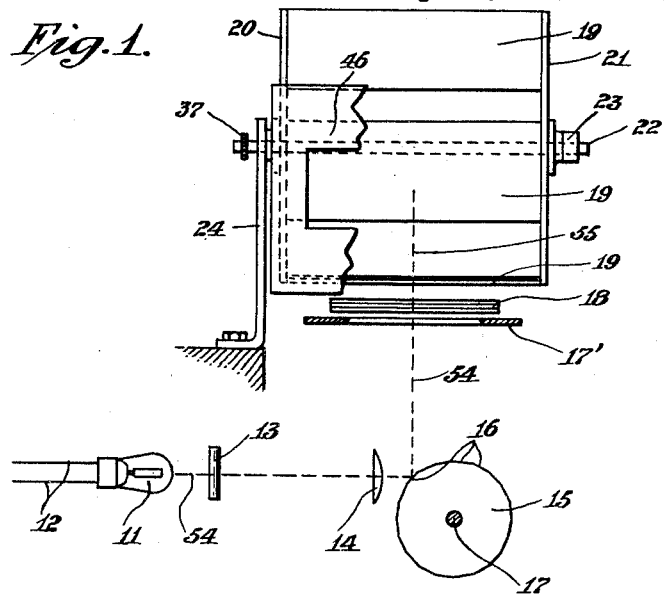
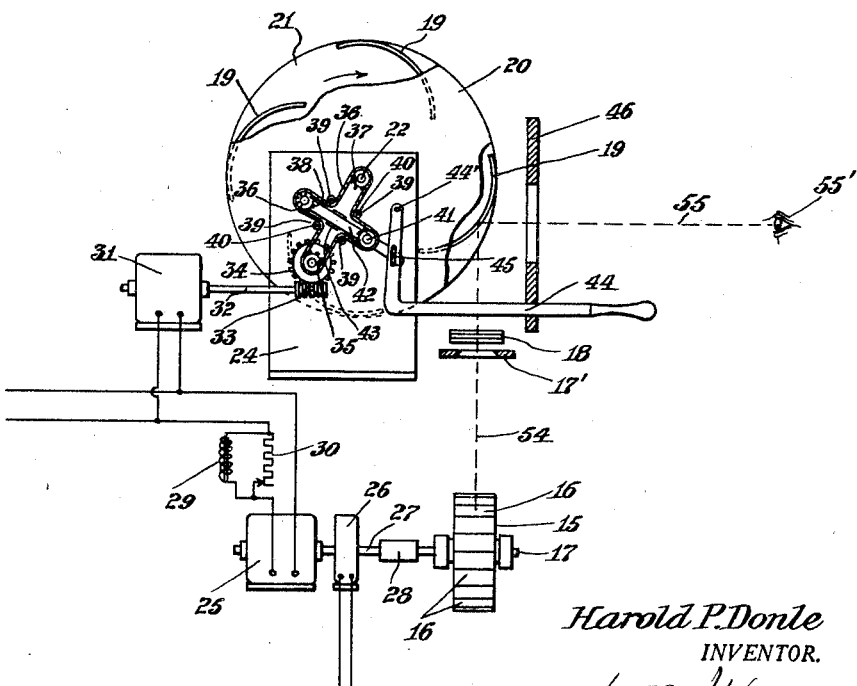
Harold P. Donle
INVENTOR.
BY
ATTORNEY June 5, 1934.  H. P. DONLE  1,961,632
TELEVISION METHOD AND APPARATUS
Filed Aug. 21, 1931   2 Sheets-Sheet 2
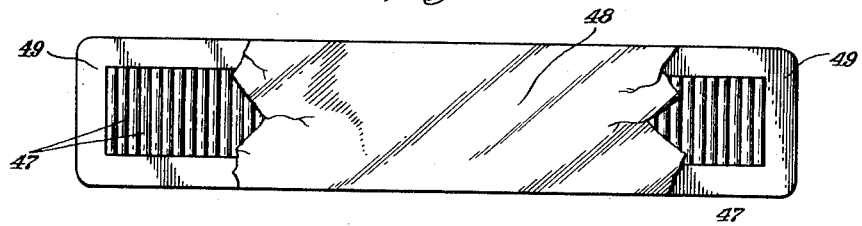
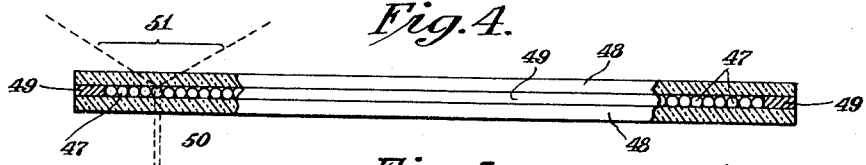
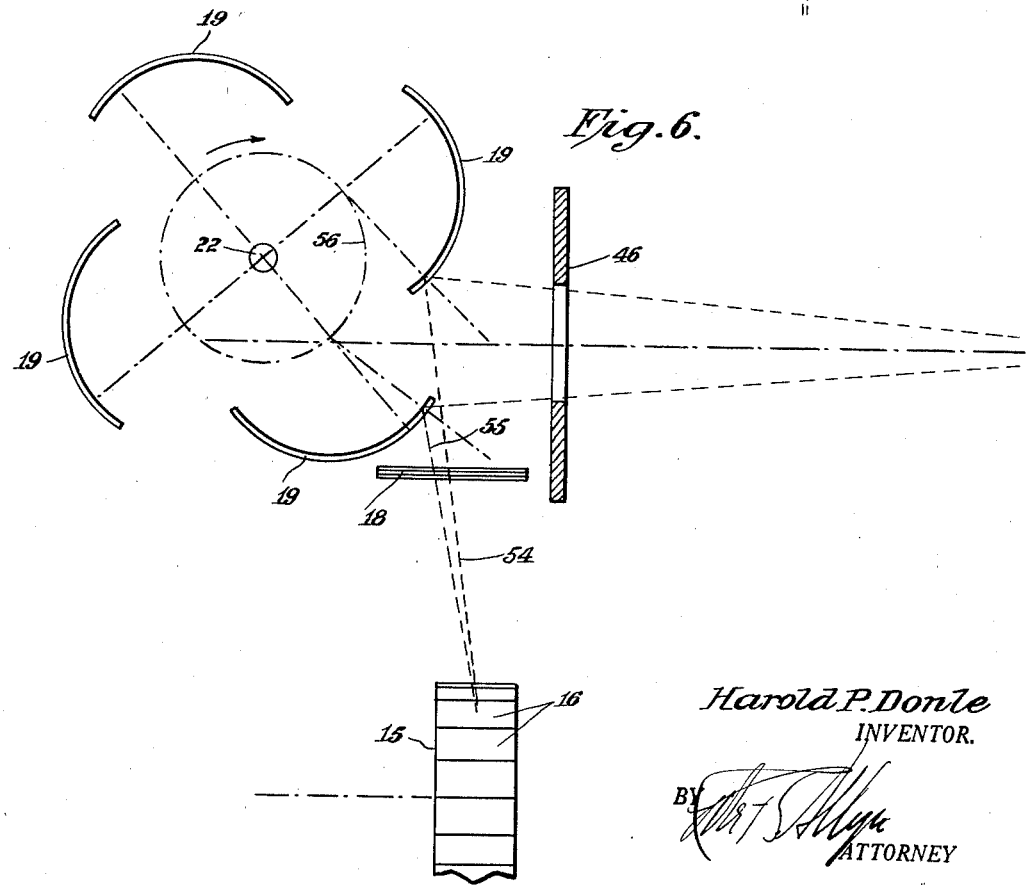
Harold P. Donle
INVENTOR.
ATTORNEY Patented June 5, 1934

1,961,632

UNITED STATES PATENT OFFICE 1,961,632

TELEVISION METHOD AND APPARATUS

Harold P. Donle, Meriden, Conn., assignor to Radio Inventions, Inc., New York, N. Y., a corporation of New York Application August 21, 1931, Serial No. 558,486

9 Claims. (Cl. 178—6)

The present invention is an improved method and means for scanning an optical image, as in television.

One object of my invention is to provide a relatively large image free from distortion.

A further object of my invention is to provide an image capable of being viewed from a wide horizontal and vertical angle, so that observers may be either sitting or standing and may be positioned over a wide area at various distances from the scanning apparatus.

Another object of my invention is to provide a scanning device of high optical efficiency.

A still further object of my invention is to provide an apparatus for smooth, accurate scanning without requiring a relatively high degree of precision in manufacture.

My invention contemplates the method of scanning an optical image in two separate operations, one scanning being by a system of cylindrically curved mirrors at right angles to the other scanning. I also prefer to use special light-diffusing means intermediate the two scanning instruments.

My invention contemplates scanning apparatus including a rotating or other line-scanning mechanism, a light-diffusing grating, a rotating field-scanning mechanism, means for viewing the completely scanned image and means for driving the rotating mechanisms at proper rotational speeds synchronously related to one another. A further improvement will be found in the framing device.

My invention may be more easily understood by reference to the drawings which form a part of this specification.

Figure 1 is a front elevation showing particularly the optical elements and apparatus of the preferred form of my invention.

Figure 2 is a side elevation showing in detail the mechanical elements of the apparatus of Figure 1.

Figure 3 represents a plan view of the preferred form of the light diffusing grating of my invention.

Figure 4 illustrates a cross section front view of the same device as in Figure 3.

Figure 5 is a cross section front view showing a modification of the light-diffusing grating of my invention.

Figure 6 is a diagrammatic elevation showing in detail the optical action of the field scanning mechanism of my invention.

Referring now to Figures 1 and 2, a light source 11 is shown as a spot source neon lamp adapted to be modulated in brilliance by an electric signal supplied through leads 12. 13 is a convex cylindrical lens whose axis lies in the plane of the end of drum 15 for gathering in one dimension the rays emergent from source 11, and 14 is a cylindrical convex lens with its axis perpendicular to that of lens 13 for further concentrating said light. The line scanner, in this case a drum 15, is mounted upon shaft 17 and carries a plurality of rectangular plane mirrors 16 about its circumference.

17' is a frame delimiting the effective traverse of the rays in one dimension. 18 is a light diffusing grating which intercepts reflected light from mirrors 16.

The field scanner consists of a plurality of convex cylindrical mirrors 19 fixed between end plates 20 and 21, which latter are mounted on a shaft 22 carried in bearing 23 and stationary bearing plate 24, said shaft constituting the central rotational axis of mirrors 19. Drum 15 and the assembly of mirrors 19 may be called the fast drum and the slow drum, respectively, since their rotational speeds are preferably widely different. A framing stop 46 placed between mirrors 19 and the observer limits the visibility to a single complete image.

Fast drum 15 may be rotated by means of motor 25 operating from an alternating current supply line and the synchronizer 26 operating from the picture signal or other synchronous source, said motor driving drum 15 through shaft 27, flexible coupling 28, and shaft 17.

In this case the current frequency supplied to synchronizer 26 may be much higher than the current frequency supplied to motor 25, and synchronizer 26 serves to reduce hunting by the low frequency motor 25. Flexible coupling 28 further reduces any hunting effect of motor 25 and provides for a constant speed of drum 15.

The slow drum on shaft 22 may be rotated at a speed synchronously related to the speed of fast drum 15, by means of synchronous motor 31 operating from the same alternating current source as motor 25, rotational motion being transmitted to shaft 22 through shaft 32, worm 33, toothed gear 34, sprcoket 35 fixed to gear 34, chain 36, and sprocket 37 fixed on shaft 22.

A sprocket shifting mechanism interposed along chain 36 for adjusting the space phase relation of sprockets 35 and 37 consists of four sprockets 39 rotatable on shafts 40 fixed to bearing plate 24, two sprockets 38 rotatable on shafts 41 which are fixed to sliding bar 42, guide 43 for restricting the motion of bar 42, and framing lever 44 pivoted to bearing plate 24 at point 44' and engaging pin 45 fixed in bar 42. Movement of lever 44 is transmitted to bar 42 and acts to shift the angular relation between sprockets 35 and 37, for framing the scanned image vertically. Sufficient friction exists between sliding bar 42 and guide 43 to maintain the shifting sprockets in position after adjustment by lever 44.

When the lever 44 is moved, the angular position of the slow drum is changed with respect to time, and the image appears to move vertically with the drum so that it becomes properly positioned vertically with respect to framing stop 46.

The time phase of motor 25 may be adjusted by shifting the phase of current supply to said motor, as by the use of the combination of a reactor 29 and variable resistor 30 in series with one or both supply leads to said motor.

When the resistor 30 is varied the angle of the armature in motor 25 is changed with respect to time, and fast drum 15 assumes a similar changed angle. The image appears to move horizontally with drum 15 and becomes properly positioned horizontally with respect to framing stops 17' and 46.

An alternative method of horizontal framing is to change the relative synchronous power or loading provided by motor 25 and synchronizer 26, e. g. by means of a rheostat in the circuit of either or both these members.

In Figures 3 and 4, the preferred form of diffusing grating 18 is shown in detail. A plurality of small rods 47 of glass, quartz, or other suitable transparent refracting substance are laid closely together and may be bound by means of substantially transparent cement, and/or clamping devices, or other convenient means, in a frame consisting of two glass plates 48 and a spacer 49. The diameter of rods 47 is preferably substantially less than the horizontal dimension of the effective elemental area used in scanning, although they are indicated larger for purposes of clear illustration.

The action of grating 18 is illustrated in Figure 4 by the path of a light beam 50 which on passage through said grating is diffused over a wide angle 51 in a plane perpendicular to the axes of rods 47. The rays suffer no substantial refraction in a plane or planes parallel to the axes of said rods.

The efficiency of the grating 18 is superior to that of a translucent screen such as one of ground glass which has previously been utilized in scanning apparatus. The grating is also superior to a ground glass screen in its provision of selective diffusion effective in one dimension only.

In Figure 5, a modification of the structure of grating 18 is shown. A plate 52 of glass or similar substance is provided on one or both plane surfaces with a plurality of parallel ridges 53 whose surfaces are portions of cylinders, formed by molding, grinding, scratching or other suitable process. The ridges 53 accomplish substantially the same purpose as rods 47 of Figure 4 although less diffusion occurs if said ridges are formed upon only one plane surface of plate 52. Plates 48' and spacers 49' are desirable for protection, but may be omitted.

Referring again to Figures 1 and 2, a light ray 54 is shown projected from source 11 upon convex cylindrical lens 13, passing to rotating mirror drum 15, whence it is reflected to grating 18 and diffused therefrom along the length of moving mirrors 19. Grating 18 is so mounted that the length of rods 47 therein is perpendicular to the end plane of drum 15. A single beam 55 after diffusion is shown falling upon mirror 19 and being reflected to the eye of an observer indicated at 55'.

Referring to Figure 6 depicting the action of field scanning mirrors 19, light beam 54 moves along grating 18 in the form of a linear light spot whose dimension in the direction of rods 47 is much greater than its dimension in a direction across said rods, and appears as such to an observer viewing grating 18 directly. The dimension of this light spot may be varied and controlled by the position of lenses 13 and 14 shown in Figure 1, or by another suitable optical system.

The appearance to an observer viewing upon mirror 19 the image of the light spot coming from grating 18 is that the spot is approximately square or rectangular and slides upon the surface of mirror 19 as said mirror moves across the field of view. The dimensions of the spot thus viewed may be varied as set forth above, for the purpose of increasing picture detail, providing a uniform visual field, etc.

There are several factors to be carefully chosen in the design of the slow drum of my invention, e. g., the radius of curvature of mirrors 19, the distance of their centers of curvature from the axis of shaft 22, and the angular extent of mirrors 19 must be such as to provide proper scanning action. Certain possible approximate ratios of these factors as found by experience to be operable are illustrated in Figure 6, in which 56 is the circle of centers of the mirrors 19. I do not limit myself to these ratios, however, as other suitable ones may be found for instance by constructing a geometric plan, such as Fig. 6, in accordance with the following principles.

Still referring to Fig. 6, and assuming that the mirror drum is rotating in the direction indicated by the arrow, it is to be noted that the effective distance from the rotational centre of the successively higher portions of mirror 19 utilized by any given ray of beam 54 progressively increases as the mirror moves downward relative to this beam.

This increasing radial distance of such portion of the mirror causes the ray of light striking thereupon to reach the eye of the observer at such an angle that it will appear to him as coming from points successively displaced downwards, as the drum rotates, so combining with the downward motion of the mirror as to cause a vertical scanning of the field.

Further to clarify this action, consider only the ray of beam 54 depicted in Fig. 6 as striking the mirror which is just entering the field of view. As such mirror progresses downwardly, the point of reflection will suffer two displacements, the one in a downward direction, and the other in a lateral direction away from the center of rotation. These displacements are due respectively to the rotation of the mirror, to its eccentric position and the radius of curvature.

Since the angle of reflection of the incident beam is a function of these variables, it is manifest that by properly choosing the latter, the resultant function can be made to have a value which will accord with the foregoing description of progressive and substantially uniform vertical displacement of the reflected beam to produce field scanning.

Referring to Fig. 6, a suitable construction for the direct production of a picture approximately 3" x 4" in size uses mirrors 19 each with a radius of 2¾" mounted with their centers on line 56 as a circle 2⅜" in diameter. The grating 18 is 1" in width by 6" in length and comprises approximately 200 rods. The fast drum is 3" in diameter and carries mirrors 16 each 1" long by somewhat less than ½" wide.

The eccentric placement of mirror 19 gives a similar effect in regard to reflection of beam 54, as would be secured by a plane mirror located at the same point and having imparted to it a motion resulting from a rotation about its own axis, and a rotation of its axis about the center of the drum.

The radius of mirror 19 can be increased with a consequent increase of the effective vertical picture element dimension. Likewise this radius of the mirror can be decreased with a lessening of such vertical picture element dimension. In practice it is preferred that the radius be chosen so that the picture elements will merge into a uniform field with such degree of slight overlap as may be necessary to preserve the appearance of continuity. It is evident that the vertical picture element dimension is also influenced by the width of beam 54 which should accordingly be adjusted as by changing the position of lens 13, to give the above indicated desired result.

While mirrors 19 have been indicated as being of limited extent, it is possible to increase their dimensions to an extent only limited by possible mutual interference of either a mechanical or optical nature.

The product of the number of mirrors 19 and the speed of shaft 22 in R. P. S. is equal to the number of pictures per second. For example, the number of said mirrors may be 4, and the speed of shaft 22, 5 R. P. S. (300 R. P. M.) for scanning 20 pictures per second. Similarly, the product of the number of mirrors 16 and the speed of drum 15 in R. P. S. is equal to the product of the number of lines per picture and the number of pictures per second. For example, the number of mirrors 16 may be 20, and the speed of drum 15, 60 R. P. S. (3600 R. P. M.) for scanning a 60 line picture at 20 pictures per second.

The size of the image as viewed directly is equal to the size of the useful field of mirrors 19 and may be apparently enlarged by the interposition of a suitable lens between mirrors 19 and the observer.

Many variations may be applied to the apparatus as above disclosed, within my broad invention.

Other line-scanning means, such as a radially slotted disc, may be substituted for the line scanning drum 15 illustrated herein.

Although the use of separate motors 25 and 31 is preferable for maintaining close synchrony of the scanned image without objectionable shifting, the use of a single motor and appropriate gearing for rotating both fast and slow scanning mechanisms is feasible.

I claim:

1. A system of scanning an optical image including means for scanning a light source in one direction to produce a moving light beam, means for selectively and unidimensionally diffusing said beam substantially only in the plane of its motion, and means for periodically displacing said diffused beam to effectively generate a luminous plane.

2. Television apparatus comprising a light source, line scanning means in conjunction therewith, selective diffusing means receiving the line-scanned light, a system of convex cylindrical mirrors receiving light from said diffusing means, and means for moving each of the mirrors successively across the field of view so as to cause the rays reflected from said mirrors to any accessible point in space to appear emergent from successive portions of said mirrors.

3. Television scanning apparatus including a modulated light source, an optical system for directing the light therefrom, line scanning means in said light path, a selective diffusing screen, a plurality of convex cylindrical reflecting elements in rotary motion, and a viewing aperture, said elements being arranged in the order named with regard to their optical action.

4. Television apparatus comprising a light source, a light collecting optical system, a rotating drum carrying a plurality of substantially rectangular plane mirrors upon its circumference in said light path, means for selective diffusion of light reflected from said rotating drum, a system of convex cylindrical mirrors moving in the path of the diffused light, and means for viewing the completely scanned image as reflected from said convex cylindrical mirrors.

5. In television apparatus, the method of securing scanning displacement in at least one dimension which consists of moving a segment of a substantially cylindrical mirror eccentrically to its bisecting radius, projecting a beam of light upon it, and collecting the light reflected from said mirror.

6. Television apparatus including a light source, line scanning means receiving light therefrom, means for selectively diffusing said light and including a plurality of cylindrical light transmitting members arranged with parallel axes, a plurality of cylindrical mirrors receiving the light from said diffusing means and means for moving each of said mirrors successively across the field of view so as to cause the rays reflected from said mirrors to appear emergent from successive portions of said mirrors.

7. A television scanning system including means for scanning light in two dimensions and selective diffusing means comprising a grating whose elements are spaced more closely than the width of a picture element scanned in one dimension, said grating intercepting the path of the scanned light.

8. A television scanner including means for scanning a light beam in one dimension, means for diffusing the scanned light beam substantially in one dimension only comprising a plurality of substantially parallel transparent rods, great in number with respect to the number of elemental scanning areas constituting a single scanned line, and means for scanning the diffused light beam in the other dimension.

9. Television scanning apparatus comprising a line scanner and a rotating field scanner having a series of cylindrical curved mirrors coacting with the line scanner to permit direct vision, said mirrors being mounted with the elements of their surface parallel with their axis of rotation and being eccentrically disposed with respect to said axis, one longitudinal edge of the optically effective surface of each mirror being materially nearer to the center of the field scanner than the opposite edge.

HAROLD P. DONLE.